(12) United States Patent
Bowen

(10) Patent No.: US 6,567,092 B1
(45) Date of Patent: May 20, 2003

(54) METHOD FOR INTERFACING TO ULTRA-HIGH RESOLUTION OUTPUT DEVICES

(75) Inventor: Andrew Bowen, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/247,885

(22) Filed: Feb. 10, 1999

(51) Int. Cl.$^7$ ................................. G06T 1/20
(52) U.S. Cl. ................ 345/506; 345/502; 345/544; 345/2.1
(58) Field of Search ................. 345/1–3, 501, 345/505, 506, 522, 530, 531, 544, 1.1, 2.1, 3.2

(56) References Cited

U.S. PATENT DOCUMENTS

| | | | | |
|---|---|---|---|---|
| 4,800,376 A | * | 1/1989 | Suga et al. | 345/1 |
| 5,459,477 A | * | 10/1995 | Fukuda et al. | 345/1 |
| 5,767,858 A | * | 6/1998 | Kawase et al. | 345/430 |
| 5,841,444 A | * | 11/1998 | Mun | 345/506 |
| 5,956,046 A | * | 9/1999 | Kehlet et al. | 345/502 |
| 6,046,709 A | * | 4/2000 | Shelton et al. | 345/1.1 |
| 6,104,414 A | * | 8/2000 | Odryna et al. | 345/509 |
| 6,191,800 B1 | * | 2/2001 | Arenburg et al. | 345/505 |

OTHER PUBLICATIONS

Ueda et al "A multiprocessor system utilizing enhanced DSP's for image processing", Systolic Arrays, 1988 International Conference, Date: May 25–27, 1988. pp. 611–620.*

"A sorting classification of parallel rendering" Molnar et al, IEEE Parallel Rendering, 7/94, pp. 23–32.*

* cited by examiner

Primary Examiner—Kee M. Tung
(74) Attorney, Agent, or Firm—Woodcock Washburn LLP (57) ABSTRACT

A method for interfacing to ultra-high resolution output devices. The basic idea of the present invention is to subdivide an ultra-high resolution display screen into narrow strips or column subsections, thereby enabling the mapping of multiple pixel interfaces to it. In this manner, the full pixel display is completely mapped. As such, multiple image generators are able to create in parallel their specific narrow strip of the full pixel display using view frustum culling, which is known by those of ordinary skill in the art. It should be appreciated that an interface in accordance with the present invention is not tied tightly to a scanning architecture. As such, this keeps a level of abstraction between the image generator and the many different types of display devices. Furthermore, since this interface is by design a rasterization interface, more image generators and less expensive image generators can be used for driving the display device. Moreover, by abstracting the interface, it necessitates a line buffer within the display device, thereby removing the need for transferring the pixel data in actual real-time.

20 Claims, 7 Drawing Sheets

METHOD FOR INTERFACING TO ULTRA-HIGH RESOLUTION OUTPUT DEVICES

TECHNICAL FIELD

The present invention relates to the field of displaying images and data. More specifically, the present invention relates to the field of ultra-high resolution displays.

BACKGROUND ART

Currently, there is a wide variety of devices and techniques utilized to visually display analog and/or digital signals containing moving images, data, and the like, thereby enabling people to view this information. Many of these display devices are very familiar to the general public. For instance, moving images and data are visually displayed on television sets, computer monitors, and arcade video games, to name a few. It should be appreciated that there are many different technologies which are utilized to implement these type of display devices. Some of these technologies include a cathode ray tube (CRT), a liquid crystal display (LCD), a laser based system, a reflective LCD, and a plasma display.

Furthermore, there are other types of monitors and display devices that display moving images and data which have exceptionally high bandwidth requirements compared to typical monitors. These types of monitors usually display ultra-high resolution images. But there are problems associated with implementing these type of monitors. One of the main problems is providing an exceptionally high bandwidth interface between one or more image generators and a ultra-high resolution display. One prior art solution for providing a high bandwidth interface is to design and build a point solution interface for a specific bandwidth (e.g., 3.6 gigabytes/sec). In other words, design and build a particular interface which operates with a specific scanning architecture of a ultra-high resolution display. It should be appreciated that there are several disadvantages to this prior art point solution interface.

One of the main disadvantages of this prior art point solution interface is that it is very expensive. For instance, since the scanning architectures at these ultra-high resolutions are very complicated, there is a lot of overhead in designing and building an interface specifically for an ultra-high resolution monitor. Furthermore, for every different type of ultra-high resolution scanning architecture, a new interface has to be designed and built basically from scratch. As such, this prior art interface solution is not very cost efficient because it does not provide any type of interface standardization. Another disadvantage of the above mentioned prior art interface solution is that the resulting interface is specifically limited to its designed operating bandwidth (e.g., 3.6 GB/sec). Therefore, if there is a need for an interface having a larger operating bandwidth (e.g., 4.0 GB/sec), the existing interface does not satisfy this desired operating bandwidth. As such, a new interface has to be designed and built, as described above.

Another disadvantage of the prior art point solution interface described above is that it would typically need an extremely large amount of wires and there would be the concern of skewing all of the wires appropriately. Moreover, the large amount of wires results in a very thick cable that would be very expensive and would also lose desirable flexibility.

Figure 1:
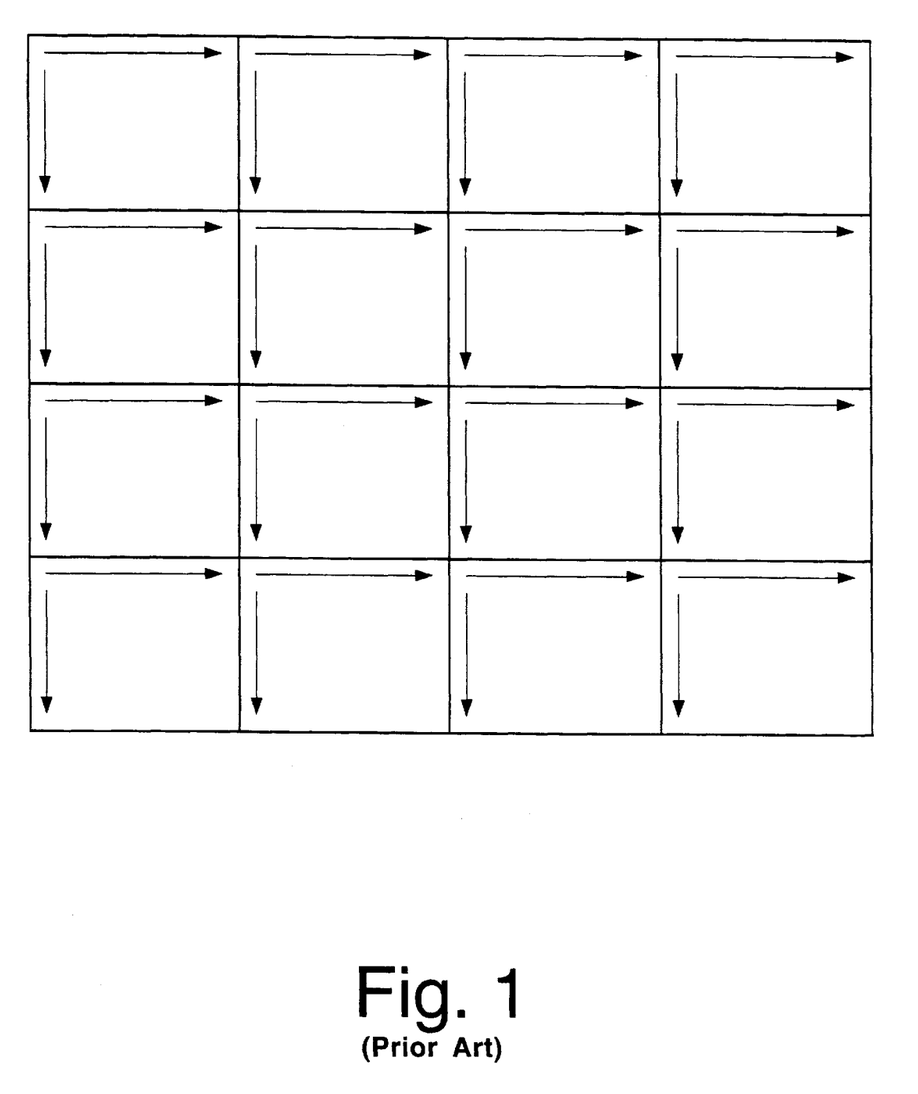
FIG. 1 is a diagram illustrating one of the prior art ways of implementing multiple interfaces by breaking up image data into a grid of multiple regions.

Another prior art solution for providing an exceptionally high bandwidth interface is to use multiple smaller interfaces to couple an image generator to an ultra-high resolution display. One of the ways to implement multiple interfaces is to break up image data into a grid of multiple regions of equal size, as shown in FIG. 1. But there are disadvantages associated with this prior art interface grid solution. One of the main disadvantages is that the scanning architecture of an ultra-high resolution monitor needs to be built specifically to operate, in the manner of the interfaces. As such, the existing interfaces can only be use for a specific type of scanning architecture.

Another disadvantage associated with the prior art interface grid solution is that the regions located below a horizontal seam are not temporally aligned with the regions located above the horizontal seam. As such, there is a need to buffer an entire frame of data of an ultra-high resolution image. This buffering results in two further disadvantages. The first disadvantage is that extra memory devices are needed in order to buffer the entire frame of data thereby resulting in higher costs, additional heat, and utilizing more board space. The other disadvantage of buffering the entire frame of data is that it adds another frame of latency to the ultra-high resolution display. An additional frame of latency is specifically problematic for visual simulation, which is a driving force behind ultra-high resolution displays. Specifically, visual simulation is an active feedback system. As such, it is important that a visual simulation system visually react to any received input signals (e.g., from a joystick) in a short amount of time (e.g., less than 50 milliseconds). Otherwise, the images displayed by the visual simulator appear unrealistic to a viewer. Therefore, the addition of another frame of latency can slow down the reaction of the visual simulator thereby causing the visual simulation experience to be unrealistic.

Figure 2:
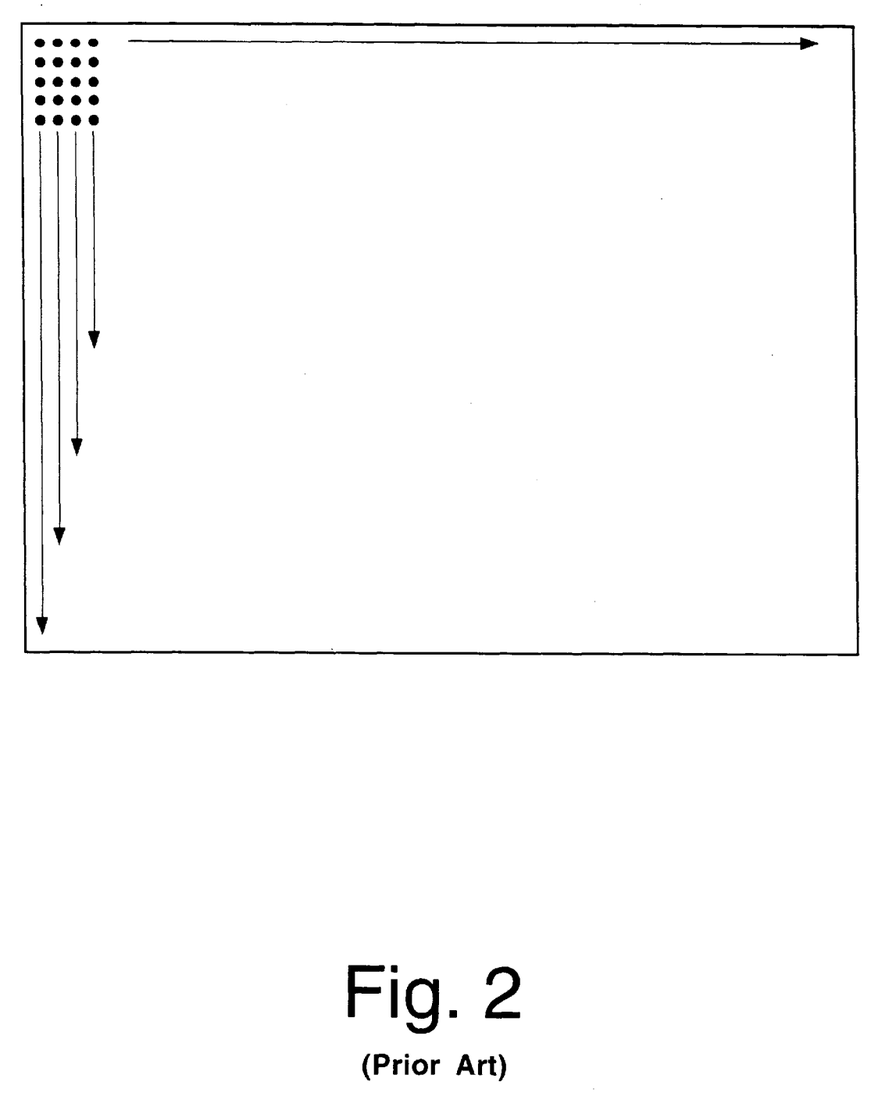
FIG. 2 is a diagram illustrating another prior art way of implementing multiple interfaces by having each interface only deal with a single pixel column of image data.

Another prior art way to implement multiple small interfaces to couple an image generator to an ultra-high resolution display is to have each interface only deal with a single pixel column of image data, as shown in FIG. 2. In other words, if there were 16 interfaces, one interface would deal with a first single pixel column of image data while a second interface would deal with a second single pixel column of image data and so forth. Therefore, the 16 interfaces would transmit 16 pixels in parallel to the ultra-high resolution display. But there are disadvantages associated with this prior art single pixel column interface solution. One of the main disadvantages is that it lacks the ability to run things in a parallel fashion. For example, 20 million pixels at 60 Hertz is a lot of data to move and one graphics card may not have enough rendering bandwidth, to generate images that large in real-time. As such, multiple image generators can be used to generate this much data. The problem is that custom hardware has to be created to match the kind of pixel interleaving that needs to be supported, resulting in very expensive overhead in designing the system. Furthermore, this prior art solution exhibits some of the same disadvantages as the prior art point solution interface, described above.

Accordingly, a need exists for a method and system for providing an exceptionally high bandwidth interface between an image generator and an ultra-high resolution display which requires huge volumes of data. A further need exists for a method and system which meets the above need but is not very expensive. Still another need exists for a method and system which meets the above need and provides a standard for an exceptionally high bandwidth interface. Yet another need exists for a method and system which meets the above need and is not specifically limited to one operating bandwidth. A further need exists for a method and system which meets the above need and which does not require a large amount of wires. Still another need exists for a method and system which meets the above need and which does not have to be used with only one specific type of scanning architecture. A need also exists for a method and system which meets the above need and produces an image that is temporally aligned. Another need exists for a method and system which meets the above need but which does not require buffering an entire frame of data of an ultra-high resolution image. Yet another need exists for a method and system which meets the above need and which does not add another frame of latency. A further need exists for a method and system which meets the above need and has the ability to run things in a parallel fashion.

DISCLOSURE OF THE INVENTION

The present invention provides a method and system for providing an exceptionally high bandwidth interface between an image generator and an ultra-high resolution display which requires huge volumes of data. The basic idea of the present invention is to subdivide an ultra-high resolution display screen into narrow strips or column subsections, thereby enabling the mapping of multiple pixel interfaces to it. In this manner, the full pixel display is completely mapped. As such, multiple image generators are able to create in parallel their specific narrow strip of the full pixel display using view frustum culling, which is known by those of ordinary skill in the art.

It should be appreciated that an interface in accordance with the present invention is not tied tightly to a scanning architecture. As such, this keeps a level of abstraction between the image generator and the many different types of display devices. Furthermore, since this interface is by design a rasterization interface, more image generators and less expensive image generators can be used for driving the display device. Moreover, by abstracting the interface, it necessitates a line buffer within the display device, thereby removing the need for transferring the pixel data in actual real-time.

Specifically, one embodiment of the present invention includes a method for moving information associated with a high bandwidth display image over a plurality of cables. The method comprises the step of rendering pixels of an image. Furthermore, the method also includes the step of storing pixel data of the image within a memory device. Another step of the method includes dividing the pixel data of the image into a plurality of strips. Additionally, the method includes the step of outputting in parallel the pixel data of the plurality of strips of the image over the plurality of cables coupled to a display device.

In another embodiment, the present invention includes the steps of the above described embodiment and further includes the steps of: executing an application program on a host processor which issues graphics commands; processing vertices by a geometry circuit coupled to the host processor; and generating the pixel data through a rasterizer coupled to the geometry circuit.

In still another embodiment, the present invention includes a system for moving information associated with a high bandwidth display image over a plurality of cables. The system includes a host processor having an application program issuing graphics commands. Furthermore, the system includes a geometry circuit coupled to the host processor for processing primitives of an image. The system also includes a rasterizer coupled to the geometry circuit for generating pixel data of the image. Additionally, the system includes a memory device coupled to the rasterizer which stores the pixel data of the image. Moreover, the system includes a display interface coupled to the rasterizer to divide the pixel data of the image into a plurality of strips. Furthermore, the display interface is coupled to output in parallel the pixel data of the plurality of strips of the image over the plurality of cables coupled to a display device.

In another embodiment, the present invention includes the features of the above described embodiment and further recites that the display device performs a plurality of raster scanning sequences in parallel to display the pixel data of the plurality of strips of the image.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detail description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "generating" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

The present invention provides a method and system for providing an exceptionally high bandwidth interface between an image generator or image generators and an ultra-high resolution display which requires huge volumes of data. The present invention not only allows a single image generator to interface with an ultra-high resolution display, but also allows multiple image generators to interface with it without requiring any specially dedicated hardware. The basic idea of the present invention is to subdivide an ultra-high resolution display screen into narrow strips or column subsections, thereby enabling the mapping of multiple pixel interfaces to it. For example, given a pixel display having the dimensions of 5120×4096 pixels, the present invention could break up the pixel display area into eight column subsections of equal size, each having the dimensions of 640×4096 pixels. In this manner, the full pixel display is completely mapped. As such, multiple image generators are able to create in parallel their specific column subsection of the full pixel display using view frustum culling, which is known by those of ordinary skill in the art.

It should be appreciated that an interface in accordance with the present invention is not tied tightly to a scanning architecture. As such, this keeps a level of abstraction between the image generator and the many different types of display devices. Furthermore, since this interface is by design a rasterization interface, more image generators and less expensive image generators can be used for driving the display device. Moreover, by abstracting the interface, it necessitates a line buffer within the display device, thereby removing the need for transferring the pixel data in actual real-time.

Figure 3A:
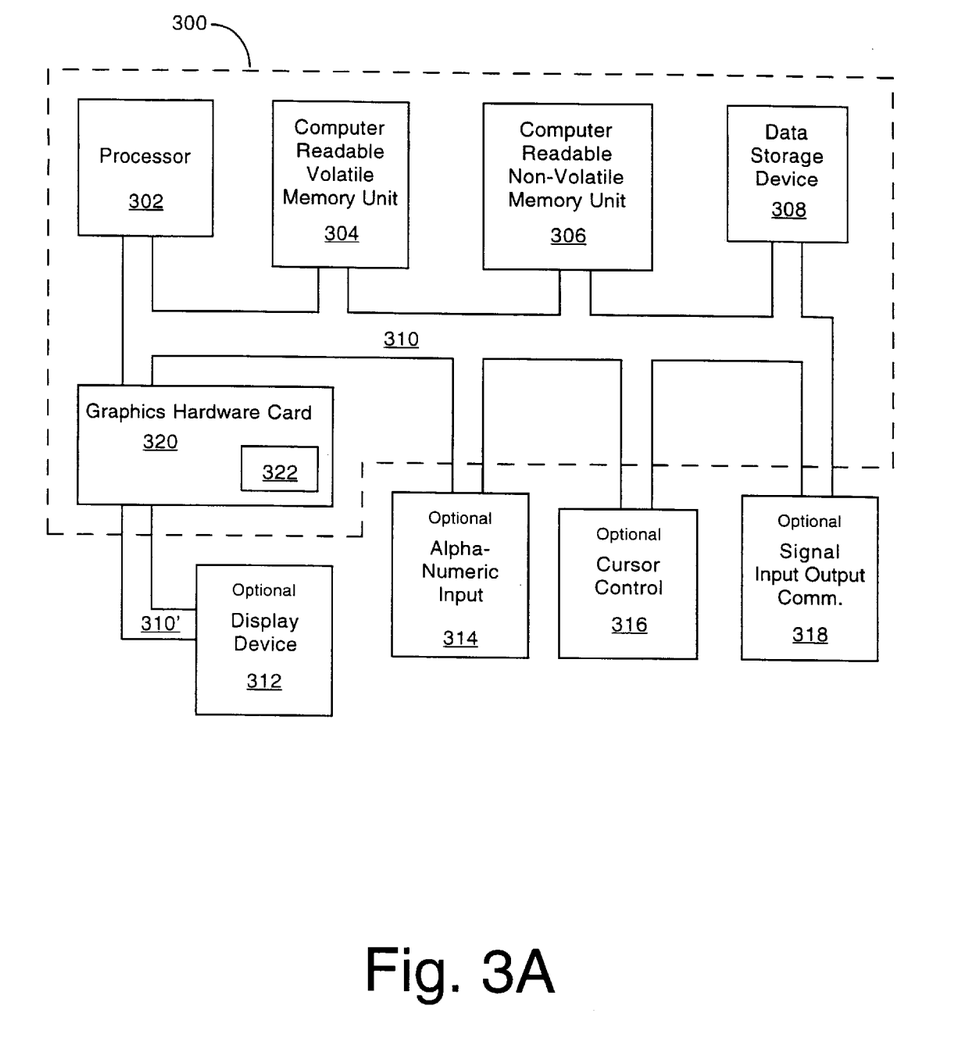
FIG. 3A is a block diagram of a computer system used in accordance with the present invention.

FIG. 3A is a block diagram of a computer system 300 used in accordance with the present invention. Within the following discussions of the present invention, certain processes and steps are discussed that are realized, in one embodiment, as a series of instructions (e.g., software program) that reside within computer readable memory units of computer system 300 and executed by processors of computer system 300. When executed, the instructions cause computer system 300 to perform specific actions and exhibit specific behavior which is, described in detail below.

In general, computer system 300 of FIG. 3A used by an embodiment of the present invention comprises an address/data bus 310 for communicating information, one or more central processors 302 coupled with bus 310 for processing information and instructions, a computer readable volatile memory unit 304 (e.g., random access memory, static RAM, dynamic RAM, etc.) coupled with bus 310 for storing information and instructions (e.g., graphics software) for central processor(s) 302, a computer readable non-volatile memory unit 306 (e.g., read only memory, programmable ROM, flash memory, EPROM, EEPROM, etc.) coupled with bus 310 for storing static information and instructions for processor(s) 302. Computer system 300 also includes a mass storage computer readable data storage device 308 such as a magnetic or optical disk and disk drive (e.g., hard drive or floppy diskette) coupled with bus 310 for storing information and instructions. Optionally, computer system 300 can include an alphanumeric input device 314 including alphanumeric and function keys coupled to bus 310 for communicating information and command selections to central processor(s) 302, a cursor control device 316 coupled to bus 310 for communicating user input information and command selections to central processor(s) 302, a signal generating device 318 coupled to bus 310 for communicating command selections to processor(s) 302, and an ultra-high resolution display device 312 coupled to bus 310 for displaying information (e.g., graphics primitives) to the computer user. Ultra-high resolution display device 312 utilized with computer system 300 of the present invention can be a liquid crystal device, cathode ray tube, or any other display device suitable for creating graphic images and alphanumeric characters recognizable to the user.

Computer system 300 of FIG. 3A also provides data and control signals via bus 310 to a graphics hardware unit ("card") 320. The graphics hardware card 320 typically contains a display processor 322 and other specialized hardware units (described in detail below) for processing a series of display instructions found within a memory stored display list to render graphics primitives. The display processor 322 supplies data and control signals to a frame buffer (not shown) which refreshes the ultra-high resolution display device 312 for rendering images (including graphics images). The graphics hardware card 320 is coupled to the display device 312 by an address/data bus 310', which enables them to communicate information.

Figure 3B:
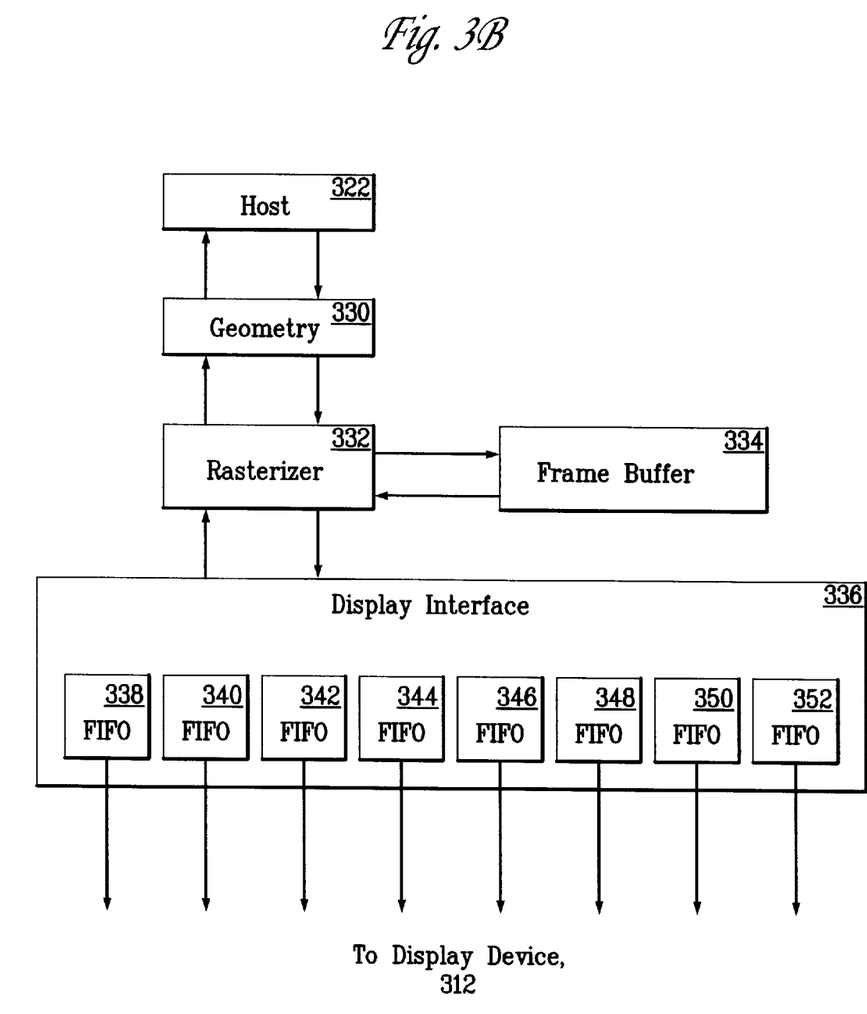
FIG. 3B is a block diagram of one embodiment of graphics hardware card in accordance with the present invention.

With reference now to FIG. 3B, which is a block diagram of one embodiment of graphics hardware card 320, in accordance with the present invention. An application program running on a host processor 322 directs the image rendering process for ultra-high resolution display device 312 in accordance with the present invention. The application program provides the high-level instructions and data to be used in the image rendering process. This information is passed on to a geometry engine circuit 330, which performs the arithmetic operations on vertices. The vertices are then filled by a rasterizer circuit 332. Rasterizer circuit 332 performs color, blending, anti-aliasing, scan-conversion, depth, Phong shading, texture, lighting, and fog functions. The final pixel values of an image are stored within a contiguous section of memory within a frame buffer 334, which is implemented within the present embodiment using random access memory (RAM).

Display interface circuit 336 controls the movement of the pixel data from frame buffer 334 to display device 312. Within the present embodiment, display interface circuit 336 has eight display channels, wherein each display channel maps to a particular portion of the pixel display of display device 312. Specifically, each display channel maps to a narrow strip or column subsection of the pixel display of display device 312. As such, the pixel display of display device 312 is divided into eight column subsections of equal size that extend the full height of the pixel display. For example, given the pixel display of display device 312 having the dimensions of 5120×4096 pixels, the present embodiment divides the pixel display area into eight column subsections of equal size, each having the dimensions of 640×4096 pixels. In this manner, the eight display channels of display interface circuit 336 completely map the pixel display of display device 312. It should be appreciated that display interface circuit 336 of the present embodiment is well suited for any number of display channels.

Still referring to FIG. 3B, each of the display channels within display interface 336 has a first-in-first-out (FIFO) circuit associated with it. Each of the FIFO circuits 338–352 requests pixel data of the stored image from specific addresses of frame buffer 334. That is, a block of specific memory addresses are assigned to each one of the FIFO circuits 338–352 from which they can request pixel data. As such, frame buffer 334 is basically divided into eight subsections from which FIFO circuits 338–352 requests pixel data. The eight subsections of frame buffer 334 form the eight column subsections of equal size that extend the full height of the pixel display of display device 312, described above. It should be appreciated that each of FIFO circuits 338–352 stores and maintains a particular amount of pixel data. It is further appreciated that each of FIFO circuits 338–352 requests pixel data through rasterizer circuit 332 because frame buffer 334 is a single ported memory. As such, rasterizer circuit 332 arbiters the data bus and acts as the frame buffer arbiter. It should be appreciated that this arrangement of graphics hardware card 320 is a pull model, but the present embodiment can also be implemented as a push model. Once the pixel data is stored within FIFO circuits 338–352, they output the stored pixel data in parallel to display device 312 over a plurality of wires.

It should be noted that graphics hardware card 320 can have many different types of configurations in accordance with the present invention. It should be further appreciated that whereas in the present embodiment, a single graphics hardware card 320 is used to interface with display device 312, multiple graphics hardware card 320 units may be used to interface with a single display device (described below).

Figure 3C:
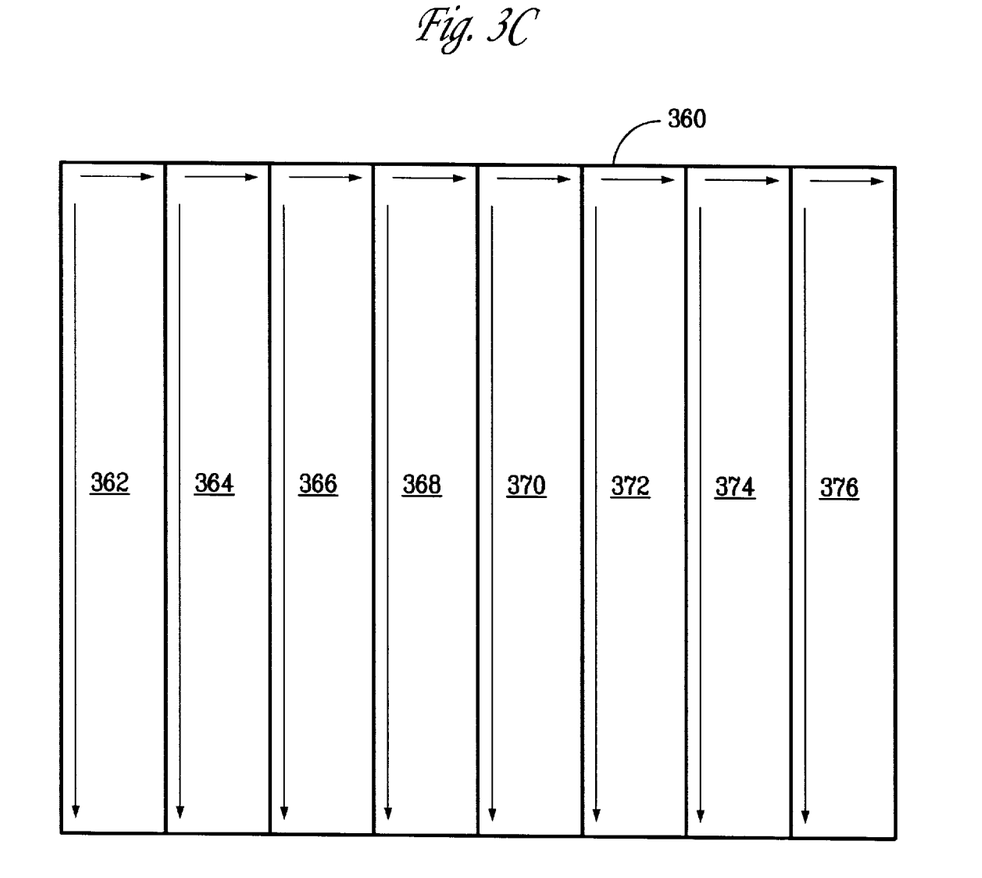
FIG. 3C is a diagram illustrating one embodiment of an ultra-high resolution display device generating an image in accordance with the present invention.

Referring now to FIG. 3C, which is a diagram illustrating one embodiment of ultra-high resolution display device 312 generating an image in accordance with the present invention. Display device 312 is coupled to receive the pixel data from FIFO circuits 338–352 of display interface 336. Display device 312 has a line buffer (not shown) within it which receives the pixel data. In this manner, display device 312 is actually lagging one line behind the source data. The benefit of having a line buffer within display device 312 is that it removes the need for display interface 336 to transfer the pixel data to display device 312 in actual real-time. Specifically, a line's worth of pixel data can be transferred over the full horizontal-time of a raster scan (including the blanking period), which means that the transfer bandwidth of display interface 336 is greatly increased.

Furthermore, display device 312 is implemented with eight scanning beams (not shown) which operate in parallel to raster scan column subsections 362–374 of pixel display 360. Each scanning beam performs the same raster scanning sequence relative to the projection surface of display device 312. For example, when raster scanning column subsection 362 of pixel display 360, the scanning beam raster scans or "draws" the pixels in a row, from left to right. Moreover, the scanning beam raster scans the rows of pixels of column subsection 362 from top to bottom. Once the bottom row of pixels is completely raster scanned, the scanning beam returns to the upper left-hand corner of column subsection 362 to begin raster scanning the top row of pixels again. In this manner, the scanning beam continually generates and updates column subsection 362 by repeating this raster scanning sequence. It should be appreciated that the scanning beams which raster scan column subsections 364–376 operate in the same manner as the scanning beam that raster scans subsection 362, described above. It should be further appreciated that the scanning architecture of display device 312 of the present embodiment can be implemented in a wide variety of fashions. Furthermore, ultra-high resolution display device 312 of the present embodiment can involve different types of technologies including a cathode ray tube (CRT), a liquid crystal display (LCD), a plasma display, a laser based system, and the like.

Figure 4:
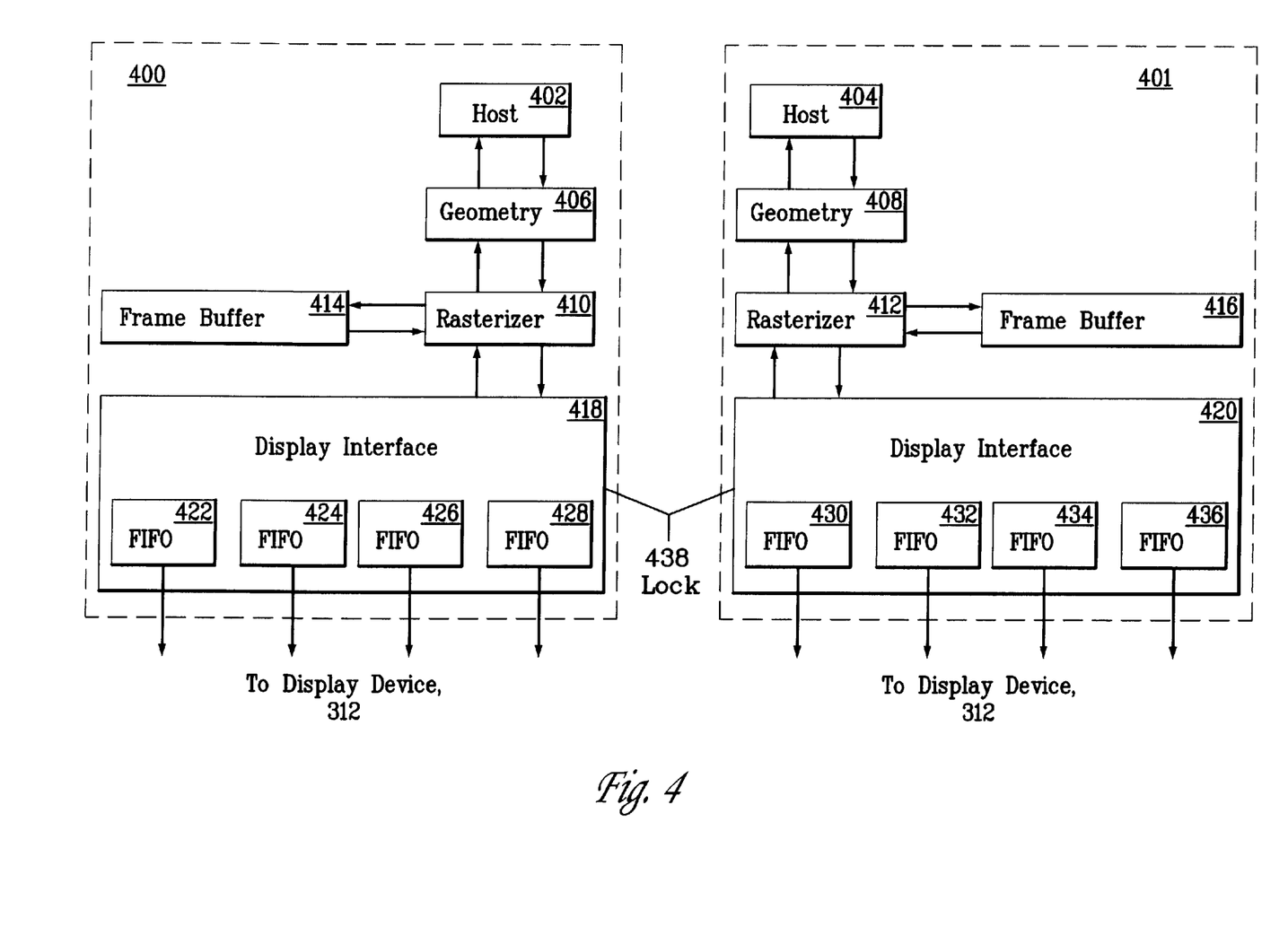
FIG. 4 is a block diagram of an embodiment of two graphics hardware cards in accordance with the present invention.

Now referring to FIG. 4, which is a block diagram of an embodiment of two graphics hardware cards 400 and 401, in accordance with the present invention. The reason for using two graphics hardware cards together is to satisfy the overall desired bandwidth of an ultra-high resolution display device (e.g., 312) which requires huge volumes of data. It should be appreciated that graphics hardware cards 400 and 401 operate in a similar manner as graphics hardware card 320 of FIG. 3B, described above. But it should be appreciated that there are some operational differences between graphics hardware card 320 and graphics hardware cards 400 and 401. One of the main differences is that graphics hardware cards 400 and 401 utilizes view frustum culling while in operation.

Specifically, the same application program is running in parallel on both host processors 402 and 404, thereby directing the image rendering process for ultra-high resolution display device 312 in accordance with the present invention. The application program provides the high-level instructions and data to be used in the image rendering process. Furthermore, the application program determines which portion of the image rendering process is being performed by graphics hardware cards 400 and 401. For example, within the present embodiment, graphics hardware cards 400 performs the image rendering process for a first half of the pixel display of display device 312, while graphics hardware cards 401 performs the image rendering process for the second half of the pixel display. As such, the application program running on host processor 402 performs view frustum culling in order to determine the data to be used for the image rendering process of the first half of the pixel display of display device 312. Additionally, the application program running on host processor 404 performs view frustum culling in order to determine the data to be used for the image rendering process of the second half of the pixel display,of display device 312. Therefore, together graphics hardware cards 400 and 401 are able to generate the image rendering process of the pixel display of display device 312.

It should be appreciated that the application program running on host processor 402 of FIG. 4 provides to a geometry engine circuit 406 the high-level instructions and data to be used in the image rendering process of the first half of the pixel display of display device 312. Furthermore, the application program running on host processor 404 provides to a geometry engine circuit 408 the high-level instructions and data to be used in the image rendering process of the second half of the pixel display. Geometry engine circuits 406 and 408 perform the arithmetic operations on vertices of their respective information. Rasterizer circuits 410 and 412 fill the vertices of their respective information. Rasterizer circuits 410 and 412 perform color, blending, anti-aliasing, scan-conversion, depth, Phong shading, texture, lighting, and fog functions. The final pixel values of the first half of the pixel display of display device 312 are stored within a contiguous section of memory within frame buffer 414. Additionally, the final pixel values of the second half of the pixel display of display device 312 are stored within a contiguous section of memory within frame buffer 416. It should be appreciated that frame buffers 414 and 416 are both implemented within the present embodiment using random access memory (RAM).

Display interface circuits 418 and 420 each controls the movement of the pixel data from frame buffers 414 and 416 to display device 312, respectively. Within the present embodiment, display interface circuit 414 has four display channels, wherein each display channel maps to a particular portion of the first half of the pixel display of display device 312. Additionally, display interface circuit 416 has four display channels, wherein each display channel maps to a particular portion of the second half of the pixel display. As such, the pixel display of display device 312 is divided into eight column subsections of equal size that extend the full height of the pixel display, as previously described above. In this manner, the four display channels of display interface circuit 418 and the four display channels of display interface 420 completely map the pixel display of display device 312. It should be appreciated that display interface circuits 418 and 420 of the present embodiment are each well suited for any number of display channels.

Referring still to FIG. 4, each of the display channels within display interfaces 418 and 420 has a first-in-first-out (FIFO) circuit associated with it. Each of the FIFO circuits 422–428 of display interface 418 requests pixel data of the stored image from specific addresses within frame buffer 414. As such, frame buffer 414 is basically divided into four subsections from which FIFO circuits 422–428 requests pixel data. Furthermore, each of the FIFO circuits 430–436 of display interface 420 requests pixel data of the stored image from specific addresses within frame buffer 416. As such, frame buffer 420 is basically divided into four subsections from which FIFO circuits 430–436 requests pixel data. The eight subsections of frame buffers 414 and 416 form the eight column subsections of equal size that extend the full height of the pixel display of display device 312, described above. It should be appreciated that FIFO circuits 422–436 operate in the same manner as FIFO circuits 338–352, previously described above. It should be further appreciated that this arrangement of graphics hardware cards 400 and 401 are a pull model, but the present embodiment can also be implemented as a push model. Once the pixel data is stored within FIFO circuits 422–436, they output the stored pixel data in parallel to display device 312 over a plurality of wires.

It should be appreciated that since the present embodiment is using more than one graphics hardware card, there is a locking mechanism 438 which frame-locks the transmission of data of graphics hardware cards 400 and 401. In this manner, FIFO circuits 422–436 are all transmitting their first line of data to ultra-high resolution display device 312 about the same time (within a couple nanoseconds). It should also be noted that graphics hardware cards 400 and 401 can have many different types of configurations in accordance with the present invention.

Figure 5:
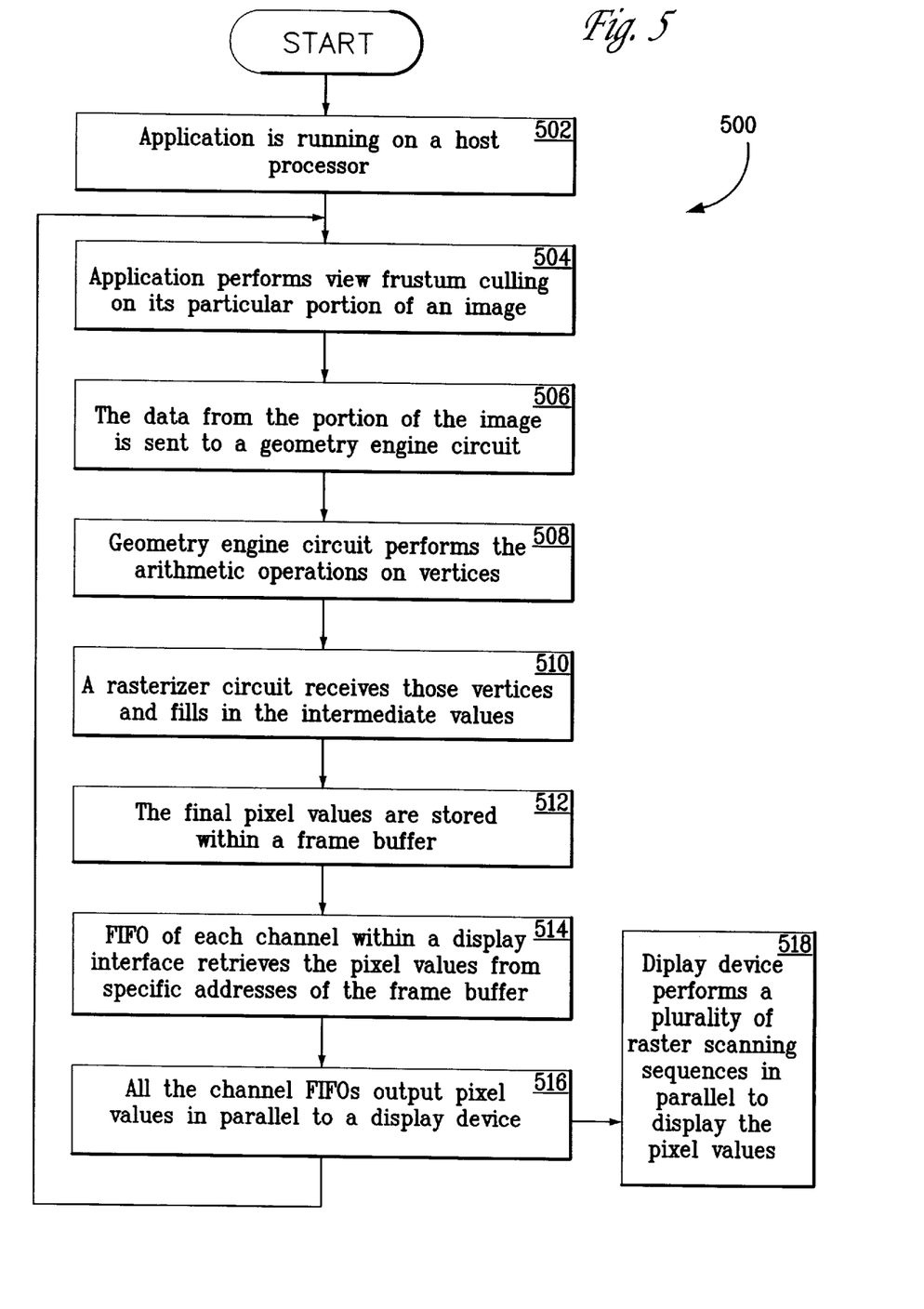
FIG. 5 is a flowchart, in accordance with one embodiment of the present invention, of an image generator performing a portion of the image rendering process of an ultra-high resolution display device which requires huge volumes of data.

Referring now to FIG. 5, which is a flowchart 500, in accordance with one embodiment of the present invention, of an image generator performing a portion of the image rendering process of an ultra-high resolution display device which requires huge volumes of data. Flowchart 500 includes processes of the present invention which, in one embodiment, are carried out by graphics hardware under the control of an application program. Although specific steps are disclosed in flowchart 500, such steps are exemplary. That is, the present invention is well suited to performing various other steps or variations of the steps recited in FIG. 5. It should be appreciated that flowchart 500 specifically describes the steps performed by a single image generator that is working together with other image generators to perform the image rendering process of an ultra-high resolution display device which requires huge volumes of data.

In step 502, within the present embodiment, an application program running on a host processor directs a portion of the image rendering process for an ultra-high resolution display. The application program provides the high-level instructions and aids data to be used during the image rendering process. At step 504, the application program running on the host processor performs view frustum culling in order to determine the data to be used for the image rendering process of its particular portion of the pixel display of the display device, as described in detail above. In step 506, the high-level instructions and data are passed on to a geometry engine circuit. At step 508, the geometry engine circuit of the present embodiment performs the arithmetic operations on vertices. In step 510, a rasterizer circuit receives the vertices and generates pixel data for the images. That is, the vertices are filled by the rasterizer circuit. Furthermore, the rasterizer circuit performs color, blending, anti-aliasing, scan-conversion, depth, Phong shading, texture, lighting, and fog functions. At step 512, the final pixel values are stored within a frame buffer.

In step 514 of FIG. 5, a FIFO circuit of each display channel of a display interface circuit retrieves the appropriate pixel data values from specific addresses of the frame buffer, as described in detail above. At step 516, all of the display channel FIFOs output the pixel data in parallel to the ultra-high resolution display device over a plurality of wires. Within step 518, the ultra-high resolution display device receives the pixel data which it buffers, as previously described above. Also at step 518, the ultra-high resolution display device performs a plurality of raster scanning sequences in parallel to display the pixel data, as described above. It should be appreciated that once step 516 is completed, the image generator of the present embodiment returns to step 504.

Thus, the present invention provides a method and system for providing an exceptionally high bandwidth interface between an image generator or image generators and an ultra-high resolution display which requires huge volumes of data. Furthermore, the present invention also provides a method and system which meets the above need and is not very expensive. Moreover, the present invention further provides a method and system which meets the above need and provides a standard for an exceptionally high bandwidth interface. The present invention provides a method and system which meets the above need and can operate at multiple bandwidths and does not require a large amount of wires. Additionally, the present invention provides a method and system which meets the above need and which can be used for different scanning architectures. The present invention also provides a method and system which meets the above need and produces an image that is temporally aligned. The present invention further provides a method and system which meets the above need and does not require buffering an entire frame of data of an ultra-high resolution image. The present invention also provides a method and system which meets the above need and which does not add another frame of latency. The present invention additionally provides a method and system which meets the above need and has the ability to run things in a parallel fashion.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for moving information associated with a high bandwidth display image over a plurality of cables, said method comprising:

executing an application program on a first and second host processor, each application program issuing graphics commands;

determining a first portion of an image using the first processor;

determining a second portion of the image using the second processor;

rendering the first and second portion of the image;

storing pixel data associated with the first portion and the second portion of the image within a first and second memory device respectively;

dividing the first portion and the second portion of said pixel data of said image into a plurality of column subsections in a first and second display interface, wherein each column subsection of said plurality of column subsection is substantially equal to the height of said image; and outputting, in parallel, said pixel data of said plurality of column subsections of said image from the first and second display interface over said plurality of cables coupled to a single display device wherein a locking mechanism is disposed between the first and second display interfaces for frame-locking the transmission of data therefrom.

2. A method as described in claim 1 wherein each column subsection of said plurality of column subsections is equal in size.

3. A method as described in claim 1 further comprising:
   processing vertices by a geometry circuit coupled to said host processor.

4. A method as described in claim 1 further comprising:
   generating said pixel data through a rasterizer.

5. A method as described in claim 1 further comprising:
   said single display device performing a plurality of raster scanning sequences in parallel to display said pixel data of said plurality of column subsections of said image.

6. A method as described in claim 5 further comprising:
   buffering a portion of said pixel data of said plurality of column subsections of said image within said single display device.

7. A method as described in claim 5 wherein said plurality of raster scanning sequences comprises a progressive scanning sequence.

8. A method as described in claim 5 wherein said plurality of raster scanning sequences comprises an interlaced scanning sequence.

9. A method as described in claim 1 wherein said image is a high bandwidth display image.

10. The method of claim 1, wherein at least one of determining a first portion of an image and determining a second portion of the image is determined using frustum culling.

11. A system for moving information associated with a high bandwidth display image over a plurality of cables, said system comprising:

at least two host processors, each processor program issuing graphics commands;

at least two geometry circuits, each circuit coupled to one of said host processors for processing primitives of an image;

at least two rasterizers, each rasterizer coupled to one of said geometry circuits for generating pixel data of said image;

at least two memory devices, each memory device coupled to one of said rasterizers which stores said pixel data of said image;

at least two display interfaces, each interface coupled to one of said rasterizers to divide said pixel data of said image into a plurality of column subsections, wherein each column subsection of said plurality of column subsections is substantially equal to the height of said image, wherein said display interface is coupled to output in parallel said pixel data of said plurality of column subsections of said image over said plurality of cables coupled to a single display device; and a locking mechanism connected between the at least two display interfaces for frame-locking the transmission of data therefrom.

12. A system as described in claim 11 wherein each column subsection of said plurality of column subsections is equal in size.

13. A system as described in claim 11 wherein said application program performs view frustum culling.

14. A system as described in claim 11 wherein said image is a high bandwidth display image.

15. A system as described in claim 11 wherein said single display device performs a plurality of raster scanning sequences in parallel to display said pixel data of said plurality of column subsections of said image.

16. A system as described in claim 15 wherein said plurality of raster scanning sequences comprises a progressive scanning sequence.

17. A system as described in claim 15 wherein said plurality of raster scanning sequences comprises an interlaced scanning sequence.

18. A system as described in claim 15 wherein said single display device buffers a portion of said pixel data of said plurality of column subsections of said image.

19. The system of claim 11, wherein the at least two host processors are simultaneously running an application thereon.

20. The system of claim 11, wherein each display interface comprises:
    at least one FIFO circuit for simultaneously transmitting data to the display device.

* * * * *